United States Patent

[11] 3,577,828

[72] Inventor Leslie P. Stickney
 Portland, Maine
[21] Appl. No. 817,049
[22] Filed Apr. 17, 1969
[45] Patented May 4, 1971
[73] Assignee Gulf & Western Precision Engineering Company
 Manchester, Conn.

[54] MILLING MACHINE
 1 Claim, 10 Drawing Figs.
[52] U.S. Cl. .................................................. 90/15, 90/16, 90/17, 77/31
[51] Int. Cl. .................................................. B23c 1/12
[50] Field of Search .................................................. 90/15, 17, 16; 77/31

[56] References Cited
UNITED STATES PATENTS

| | | | |
|---|---|---|---|
| 2,310,870 | 2/1943 | Retterath | 90/17 |
| 2,499,842 | 3/1950 | Armitage | 90/17X |
| 2,605,677 | 8/1952 | Armitage | 90/15 |
| 2,930,291 | 3/1960 | Bannow et al. | 90/17 |
| 3,080,794 | 3/1963 | Grabes | 77/31X |
| 3,452,642 | 7/1969 | Balding | 77/31X |

Primary Examiner—Gil Weidenfeld
Attorney—Meyer, Tilberry & Body

ABSTRACT: A milling machine includes a substantially vertical support having a machine head attached thereto. The machine head extends horizontally from the vertical support and includes a mounting portion which is rotatably attached to the vertical support. An electric motor mounted in the vertical support drives a ring gear on the machine head to rotate the machine head about a substantially vertical axis. The machine head includes a tool spindle. Rotational movement of the machine head moves the tool spindle in an arcuate path so that arcuate shapes may be machined. The tool spindle is preferably pivotally attached to the machine head so that sloping arcuate surfaces may be machined.

Patented May 4, 1971

INVENTOR.
LESLIE P. STICKNEY
BY Mayer, Tilberry & Body

ATTORNEYS

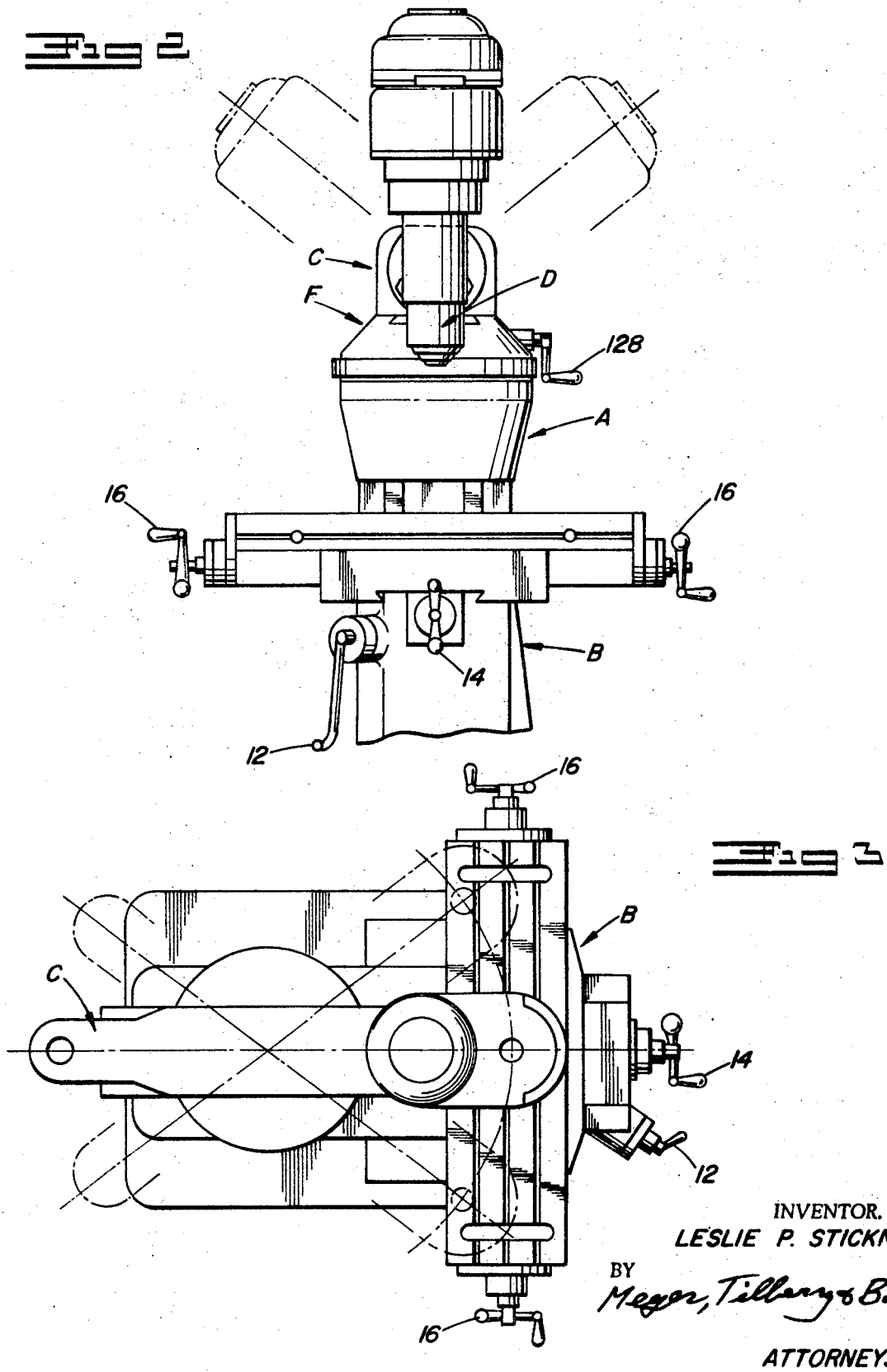

Patented May 4, 1971

INVENTOR.
LESLIE P. STICKNEY
BY
Meyer, Tilberry & Body
ATTORNEYS

MILLING MACHINE

BACKGROUND OF THE INVENTION

This application pertains to the art of milling machines and more particularly to a milling machine for machining arcuate segments.

It is often desirable to machine arcuate segments on workpieces. Prior devices for performing such operations were capable of machining arcuate segments at only a very small radius. In addition, prior machines for performing such work have been highly specialized and complicated and were not well suited for other ordinary milling machine operations. In addition, prior devices for machining arcuate segments have not been capable of machining such segments with surfaces sloping away from the vertical.

It would be desirable to have a milling machine which was capable of machining arcuate segments having variable radii by using standard adjustments on a standard milling machine. It would also be desirable to have a machine for machining arcuate segments with surfaces which slope away from the vertical.

SUMMARY OF THE INVENTION

In accordance with the present invention, a milling machine is provided with a substantially vertical support on which a machine head is mounted. The machine head includes a mounting portion which is rotatably attached to the vertical support for rotational movement about a substantially vertical axis. The machine head is provided with a tool spindle in which a milling tool may be mounted for milling a workpiece supported on the bed of the machine. An electric motor mounted on the vertical support is drivingly connected with gear means on the mounting portion of the machine head. Energization of the electric motor rotates the machine head about a substantially vertical axis to move the tool spindle in an arcuate path. In a preferred arrangement, the tool spindle lies in a substantially vertical plane which extends through the axis about which the machine head rotates. The tool spindle is then pivoted about a substantially horizontal axis perpendicular to that plane so that arcuate shapes may be machined with surfaces which slope away from the vertical. The machine preferably includes a slideway between the mounting portion and the tool spindle so that the distance of the tool spindle from the mounting portion of the machine head may be varied in order to vary the radius of the arc through which the tool spindle moves.

In a preferred arrangement, the drive from the motor to the machine head comprises a ring gear attached to the machine head. A bearing is attached to the vertical support, and the ring gear and bearing are each provided with an outer circumferential groove. A multisegment binder ring has flanges received in the grooves to rotatably hold the ring gear to the bearing.

BRIEF DESCRIPTION OF THE DRAWING

The invention may take physical form in certain parts and arrangements of parts, a preferred embodiment of which will be described in detail in this specification and illustrated in the accompanying drawings which form a part hereof:

FIG. 2 is a front elevational view of the milling machine of FIG. 1;

FIG. 3 is a top plan view of the milling machine of FIGS. 1 and 2;

DESCRIPTION OF THE PREFERRED EMBODIMENT

Figure 1:
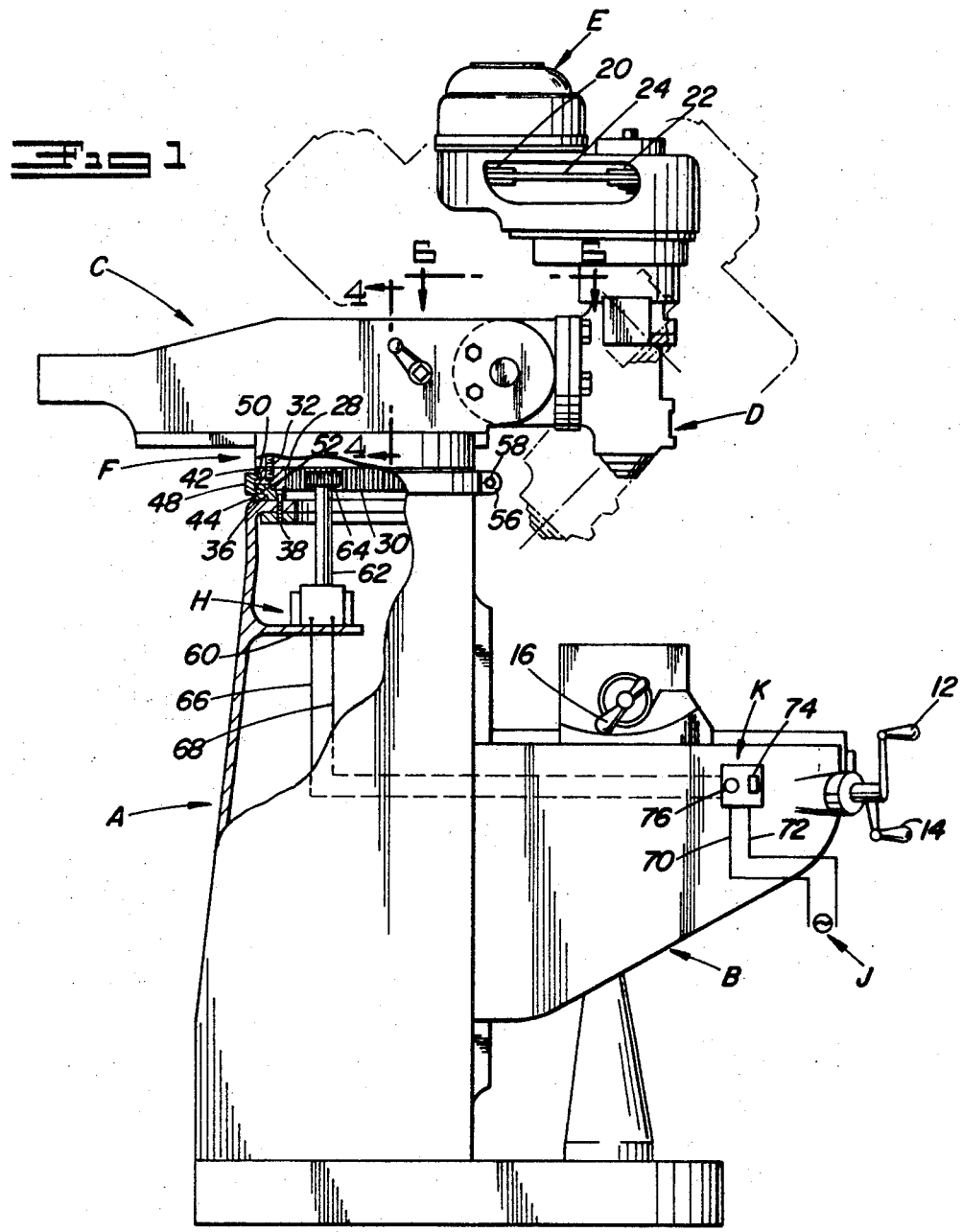
FIG. 1 is a side elevational view of a milling machine having the present invention embodied therein and with portions cut away for clarity of illustration.

Referring now to the drawings, wherein the showings are for purposes of illustrating the preferred embodiment of the invention only and not for purposes of limiting same, FIG. 1 shows a milling machine having a substantially vertical support A, a bed B and a machine head C. Bed B may be provided with adjustment means in a well known manner as by crank 12 for vertical adjustment, crank 14 for cross-adjustment or adjustment toward and away from support A, and crank 16 for lateral adjustment.

Machine head C includes a tool spindle D attached thereto. Suitable milling tools are adapted to be chucked in tool spindle D in a well-known manner. An electric motor E includes a power takeoff pulley 20 drivingly connected to a driven pulley 22 by belt 24. Driven pulley 22 rotatably drives tool spindle D to rotate a tool chucked therein for machining work positioned on bed B. Pulley 22 may be a stepped pulley along with pulley 20 for adjusting belt 24 to different grooves to vary the rotational speed of tool spindle D.

Machine head C includes a mounting portion or a mounting member F. A circular ring gear 28 having internal vertical teeth 30 thereon may be secured to mounting member F as by bolts 32 passing through suitable holes in ring gear 28 and threaded into threaded bores in the bottom of mounting member F. The heads of bolts 32 may be countersunk so that a smooth surface is presented on the bottom of ring gear 28. A circular bearing ring 36 is attached to the top of vertical support A as by bolts 38 passing through suitable holes in bearing ring 36 and threaded into threaded bores in the top of support A. The heads of bolts 38 are preferably countersunk below the top surface of bearing ring 36 so that a smooth upper surface is provided on bearing ring 36. The outer circumferential periphery of ring gear 28 and bearing ring 36 are each provided with a circumferential groove 42 and 44. A multisegment binder ring 48 has circumferential flanges 50 and 52 extending radially inward. Flanges 50 and 52 are respectively received in circumferential grooves 42 and 44 of ring gear 28 and bearing ring 36. In this manner, binder ring 48 secures ring gear 28 to bearing ring 36. The circumference of binder ring 48, and the fit of flanges 50 and 52 within grooves 42 and 44 is such that a sliding fit is maintained so that ring gear 28 may rotate relative to bearing ring 36. In a preferred arrangement, binder ring 48 is formed in two C-shaped pieces. Each C-shaped piece has an ear on each of its ends and only one of which is shown at 56 in FIG. 1. When the two C-shaped rings are positioned with their ears abutting, the two rings define a circle. A bolt 58 is then passed through holes in ears 56, and a suitable nut provided on the other end of bolt 58 clamps the ears of each C-shaped segment together so that the two C-shaped segments define a circular clamping ring. In assembly, bearing ring 36 is first secured to the top of vertical support A by bolts 38. Ring gear 28 is secured to mounting member F by bolts 32 while mounting member F is off of the machine. Mounting member F is then positioned on top of vertical support A with ring gear 28 resting on bearing ring 36 as shown in FIG. 1, the two C-shaped segments of binder ring 48 are then moved laterally inward until their flanges 50 and 52 are received in grooves 42 and 44 respectively. Bolts 58 are then placed through the holes in ears 56 of the C-shaped segments of binder ring 48. Nuts are then applied to bolts 58 to clamp ears 56 together and hold the two C-shaped segments in a circular shape defining binder ring 48.

Figure 10:
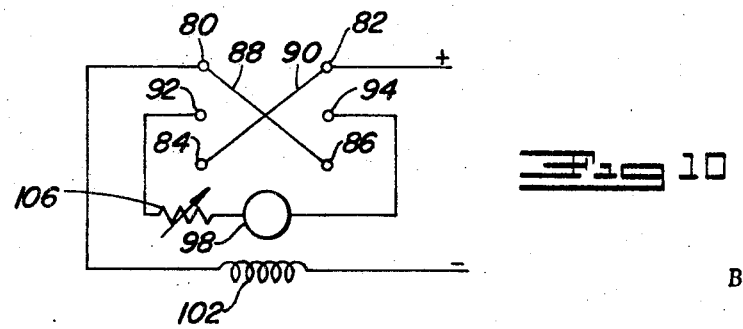
FIG. 10 is a diagrammatic illustration of a reversing and speed control arrangement for use with an electric motor in the present invention.

An electric motor H is suitably clamped in a well known manner to support 60 on vertical support A. Electric motor H includes a drive shaft 62 having a pinion gear 64 secured thereto. The external teeth of pinion gear 64 are in meshing engagement with internal teeth 30 of ring gear 28. Electric motor H is connected to a source J of electrical energy by wires 66 and 68 through control K and wires 70 and 72. Control K is suitably mounted on the side of the bed B and includes reversing button 74 and speed control button 76. The control arrangement forms no part of the present invention and those skilled in the art will be aware that various well known reversing and speed control arrangements may be provided for electric motor H. One arrangement is shown in FIG. 10 for a situation when motor H is a series motor. A four-pole double-throw switch has poles 80, 82, 84 and 86. These poles are cross connected as by wires 88 and 90. Contacts 92 and 94 of the double-throw switch are selectively connectable with either contacts 80 and 82 respectively or with contacts 84 and 86 respectively. When the switch is thrown so that contacts 80 and 92, and 82 and 94 are connected, current will flow from left to right through armature 98 and then through field windings 102. When contacts 84 and 92, and 86 and 94 are connected, current will flow from right to left through armature 98. This reversal of polarity or the direction of current flow effects reversal of the direction of rotation of the motor armature as is well known in the art. The same reversal can be effected by reversing the polarity or direction of current flow through field windings 102 rather than armature 98 simply be reversing their positions in the circuit shown. A variable resistor 106 connected in series circuit with armature 98 is adjustable by means of knob 76 of FIG. 1 to control the amount of current flow through armature 98 and thereby vary the rotational speed of motor H. In one arrangement, the speed control is preferably a speed regulating control so that motor H is supplied with sufficient power at low speeds.

In operation, motor H may be energized through control K so that ring gear 28 is rotatably driven by pinion gear 64. Rotation of ring gear 28 also rotates mounting member F and the machine head C. Rotation of machine head C moves tool spindle D in an arcuate path between shadow line positions illustrated in FIG. 3. In this manner, a workpiece supported on bed B has an arcuate surface machined thereon by a machining tool mounted in tool spindle D. The tool will cut with its vertical periphery, sideways into a workpiece.

Figure 4:
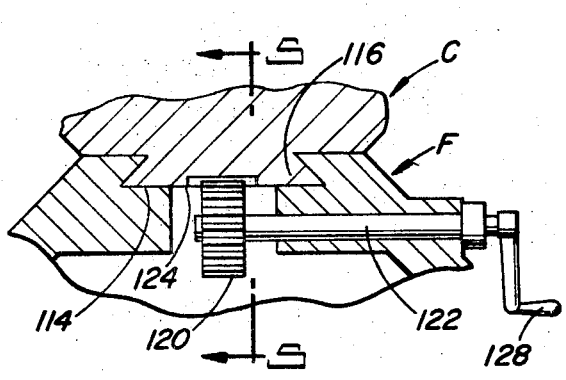
FIG. 4 is a cross-sectional view looking in the direction of arrows 4—4 of FIG. 1.
Figure 5:
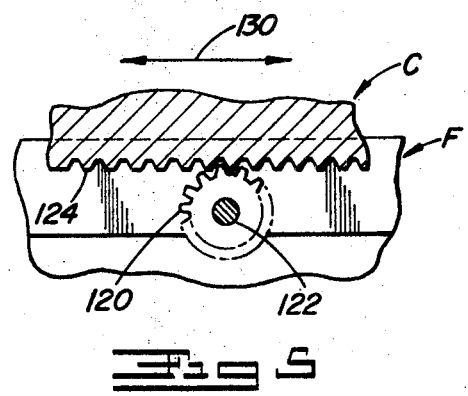
FIG. 5 is a cross-sectional view looking in the direction of arrows 5—5 of FIG. 4.

In a preferred arrangement, tool spindle D is also adjustable toward and away from vertical support A so that tool spindle D may be positioned at variable distances from the rotational axis of machine head C in order to move tool spindle D in arcuate paths of various radii. In this manner, it is possible to machine arcuate segments having various radii. While the manner of making such an adjustment is well known and may take many forms, one general type of arrangement is shown in FIGS. 4 and 5. Mounting member F is provided with a longitudinal key way 114 in its top surface while machine head C is provided with a longitudinal key 116 slideably received in keyway 114. A pinion gear 120 secured to a shaft 122 rotatably mounted in mounting member F is in engagement with longitudinal rack teeth 124 formed in the bottom of key 116 on machine head C. A suitable crank 128 may be attached to shaft 122 for rotating pinion gear 120 selectively drive rack teeth 124 and move machine head C in the direction of arrows 130 of FIG. 5. As is well known, a pointer and scale may be provided on machine head C in mounting member F respectively to accurately adjust the position of spindle D. In addition, clamping bolts may be provided for rigidly holding machine head C in an adjusted position relative to mounting member F.

Figure 6:
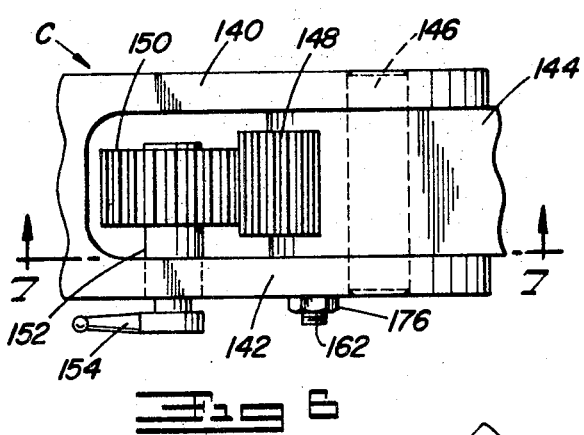
FIG. 6 is a cross-sectional view looking in the direction of arrows 6—6 of FIG. 1.
Figure 7:
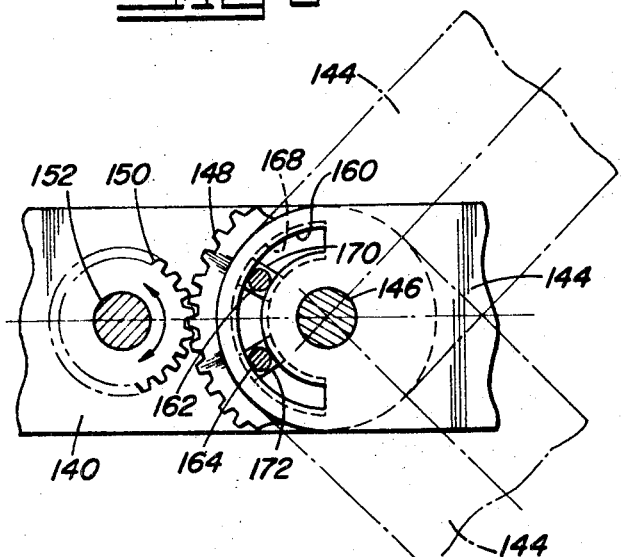
FIG. 7 is a cross-sectional view looking in the direction of arrows 7—7 of FIG. 6.

Also in a preferred arrangement, the rotational axis of tool spindle D lies in a vertical plane which passes through the rotational axis of machine head C about vertical support A. Spindle D is pivotable on a substantially horizontal axis perpendicular to this plane for pivotal movement between the shadow line positions shown in FIG. 1. With this adjustment, it is possible to machine arcuate segments having surfaces which slope away from the vertical. In other words, it is possible to machine segments of cones, and to machine them on a convex or concave arc. Various adjusting mechanisms for so adjusting tool spindle D relative to machine head C are well known and may take many forms. One such general type of adjusting mechanism is shown in FIGS. 6 and 7. Machine head C is bifurcated at its outer end so as to provide two spaced-apart arms 140 and 142. An arm 144 connected with tool spindle D is mounted between arms 140 and 142 for rotational movement about a horizontal axis on pivot pin 146. The rear portion of arm 144 is formed with gear teeth 148. A pinion gear 150 secured on a rotatable shaft 152 journaled in arm 142 meshes with gear 148. A crank 154 is provided for rotating shaft 152 and pinion gear 150 for driving gear 148 to move arm 144 between the shadow line positions as shown in FIG. 7. In one arrangement, arm 144 has a pair of holes therethrough parallel to pivot pin 146 and with the holes lying on the circumference of a circle having its center on the axis of pin 146. Arms 140 and 142 are provided with C-shaped slots, only one of which is shown at 160 for arm 140 in FIG. 7. Bolts 162 and 164 extend through the C-shaped slots in arms 140 and 142, and through the holes in arm 144. Slot 160 is preferably under cut on the outside surface of arm 140 as at 168 so that the edges of heads 170 and 172 of bolts 162 and 164 are received in under cut 168. The bottom of under cut 168 and the bottom edges of bolt heads 170 and 172 are then grooved radially of pivot pin 146. The other ends of bolts 162 and 164 extend through arm 142 and have suitable bolts applied thereto only one of which is shown at 176 in FIG. 6. The nuts may be loosened on bolts 162 and 164 to adjust the position of arm 144 by means of pinion 150 and gear 148. The bolts are then tightened so that heads 170 and 172 have their grooves engaged with the grooves of under cut 168 to hold arm 144 in adjusted position. As is well known, suitable pointers and scales may be provided on pivoted arm 144 and either arm 140 or 142 to accurately adjust the pivoted position of arm 144.

Figure 8:
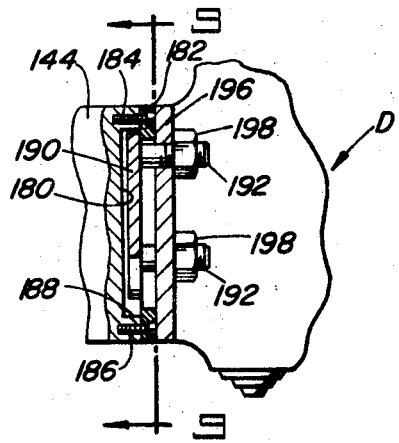
FIG. 8 is a cross-sectional view also looking in the direction of arrows 6—6 of FIG. 1.
Figure 9:
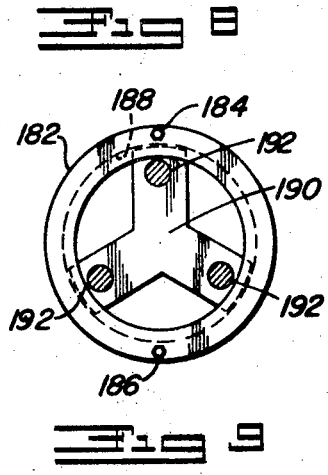
FIG. 9 is a cross-sectional view looking in the direction of arrows 9—9 of FIG. 8.

Tool spindle D is also preferably adjustable laterally of the position described above. That is, tool spindle D is pivoted on a horizontal axis which is perpendicular to the axis of pivot pin 146 of FIGS. 6 and 7. This adjustment provides pivotal movement of spindle D between the shadow line positions shown in FIG. 2. As is well known, this adjustment may take many forms and one general type of such an adjustment is shown in FIGS. 8 and 9. Arm 144 is provided with a circular recess 180 in its outer end. A circular washerlike member 182 is secured to the outer end of arm 144 as by bolts 184 and 186. Washer member 182 extends radially inward to provide a flange which defines a groove 188 in which a clamping member 190 is positioned. Clamping member 190 has threaded studs 192 welded to the front face thereof. A flange 196 on tool spindle D has holes therein through which threaded studs 192 extend. Nuts 198 threaded onto studs 192 pull flange 196 of spindle D against the outer surface of washer member 182 and pull clamping member 190 against the inner surface of washer member 182. The engaging surfaces of washer member 182, clamping member 190 and flange 196 may be radially grooved. It will be seen that loosening of nuts 198 permits rotation of clamping member 190 in groove 188 and this in turn permits rotation of tool spindle D. Tightening of nuts 198 rigidly clamps tool spindle D in any adjusted rotated position. If so desired, a pointer and scale may be provided on flange 196 of tool spindle D and washer member 182 for accurately adjusting the rotated position of spindle D.

While the invention has been described with reference to a preferred embodiment, it is obvious that modifications and alterations will occur to others upon the reading and understanding of this specification.

I claim:

1. In a milling machine having substantially vertical support means, a machine head having a mounting portion rotatably attached to said support means for rotational movement on a substantially vertical axis, said machine head having power driven tool spindle means thereon, ring gear means on said mounting portion of said machine head, said ring gear means having internal teeth thereon, bearing means on said support means, said ring gear means riding on said bearing means, said ring gear means and said bearing means having exterior circumferential groove means therein, multisegment binder ring means having flange means received in said groove means for rotatably holding said ring gear means to said bearing means, electric motor means mounted on said support means, said motor means having drive shaft means drivingly engaged with said ring gear means whereby energization of said motor means rotates said machine head.